United States Patent
Wang et al.

(10) Patent No.: US 12,165,059 B2
(45) Date of Patent: Dec. 10, 2024

(54) METHOD AND APPARATUS FOR GENERATING RECOMMENDATION MODEL, CONTENT RECOMMENDATION METHOD AND APPARATUS, DEVICE AND MEDIUM

(71) Applicant: BEIJING BAIDU NETCOM SCIENCE AND TECHNOLOGY CO., LTD., Beijing (CN)

(72) Inventors: Yaqing Wang, Beijing (CN); Hui Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 977 days.

(21) Appl. No.: 17/171,507

(22) Filed: Feb. 9, 2021

(65) Prior Publication Data

US 2021/0390394 A1 Dec. 16, 2021

(30) Foreign Application Priority Data

Jun. 11, 2020 (CN) .......................... 202010529738.2

(51) Int. Cl.
*G06N 3/08* (2023.01)
*G06F 18/2133* (2023.01)
(Continued)

(52) U.S. Cl.
CPC ............ *G06N 3/08* (2013.01); *G06F 18/2133* (2023.01); *G06F 18/214* (2023.01); *G06N 3/047* (2023.01)

(58) Field of Classification Search
CPC .............. G06F 16/9535; G06K 9/6239; G06K 9/6256; G06N 20/00; G06N 3/0454; G06N 3/0472; G06N 3/08
See application file for complete search history.

(56) References Cited

U.S. PATENT DOCUMENTS

2016/0162782 A1* 6/2016 Park ................... G06N 3/045
 706/17
2018/0157971 A1* 6/2018 Fusi ..................... G06N 7/01
(Continued)

FOREIGN PATENT DOCUMENTS

CN 108563660 A 9/2018
CN 109685155 A 4/2019
(Continued)

OTHER PUBLICATIONS

Wang, Yaqing, et al. "Zero-shot learning with a partial set of observed attributes." 2017 International Joint Conference on Neural Networks (IJCNN). IEEE, 2017. (Year: 2017).*
(Continued)

*Primary Examiner* — Randall K. Baldwin
(74) *Attorney, Agent, or Firm* — Cozon O'Connor (57) ABSTRACT

The present disclosure provides a method for generating a recommendation model, a content recommendation method, and a content recommendation apparatus, and an electronic device, and relates to an artificial intelligence field and a deep learning field. The method for generating a recommendation model includes: obtaining a graph training sample set; inputting the graph training sample set into a machine learning model to train the machine learning model, in which the machine learning model includes at least one low-rank graph convolutional network, and the low-rank graph convolutional network includes a complete weight matrix composed of a first low-rank matrix and a second low-rank matrix; in which a training objective of the low-rank graph convolutional network includes a first parameter item, a second parameter item and a non-convex low-rank item; and in responding to detecting that a training end condition is met, determining the machine learning model as a recommendation model.

13 Claims, 4 Drawing Sheets

(51) Int. Cl.
    *G06F 18/214*     (2023.01)
    *G06N 3/047*     (2023.01)

(56) References Cited

U.S. PATENT DOCUMENTS

| | | | | |
|---|---|---|---|---|
| 2018/0189650 A1* | 7/2018 | Wang | .................... | G06N 3/04 |
| 2020/0082264 A1* | 3/2020 | Guo | .................... | G06N 3/084 |
| 2021/0248459 A1* | 8/2021 | Li | .................... | G06N 3/045 |

FOREIGN PATENT DOCUMENTS

| | | | |
|---|---|---|---|
| CN | 110008397 | A | 7/2019 |
| CN | 110188427 | A | 8/2019 |
| CN | 110321422 | A | 10/2019 |
| CN | 111177559 | A | 5/2020 |

OTHER PUBLICATIONS

Tang, Jiaxi, and Ke Wang. "Ranking distillation: Learning compact ranking models with high performance for recommender system." Proceedings of the 24th ACM SIGKDD international conference on knowledge discovery & data mining. 2018. (Year: 2018).*

Qiao, Meng, et al. "A Fast Matrix-Completion-Based Approach for Recommendation Systems." arXiv preprint arXiv:1912.00600 (2019). (Year: 2019).*

Su, Fang, Hai-Yang Shang, and Jing-Yan Wang. "Low-Rank Deep Convolutional Neural Network for Multitask Learning." Computational Intelligence and Neuroscience 2019.1 (2019): 7410701. (Year: 2019).*

Chinese Patent Application No. 202010529738.2, Notice of Allowance dated Feb. 22, 2023, 5 pages.

Chinese Patent Application No. 202010529738.2, English translation of Notice of Allowance dated Feb. 22, 2023, 8 pages.

Wang, G.H. "Research on non-convex regularization method" Thesis, Northwest University, Jun. 2019, 43 pages.

Tengmin, Z. "Image Saliency Detection by Multi-feature" Thesis, Xidian University, Nov. 2015, 63 pages.

Wang, Y. et al. "Scalable Online Convolutional Sparse Coding" IEEE Transactions on Image Processing, vol. 27, No. 10, Oct. 2018, pp. 4850-4859.

Parekh, A. et al. "Enhanced Low-Rank Matrix Approximation" arXiv:1511.01966v2 Nov. 10, 2015, 10 pages.

* cited by examiner

METHOD AND APPARATUS FOR GENERATING RECOMMENDATION MODEL, CONTENT RECOMMENDATION METHOD AND APPARATUS, DEVICE AND MEDIUM

CROSS REFERENCE TO RELATED APPLICATIONS

The present application is based on and claims priority under 35 U.S.C. § 119 to Chinese Application No. 202010529738.2, filed with the China National Intellectual Property Administration on Jun. 11, 2020, the entire content of which is incorporated herein by reference.

TECHNICAL FIELD

The present disclosure relates to computer technologies, specifically to technical fields of artificial intelligence and deep learning, and in particular to a method and an apparatus for generating a recommendation model, a content recommendation method, and a content recommendation apparatus, an electronic device and a storage medium.

BACKGROUND

Graph Convolutional Network (GCN) is an extension of Convolutional Neural Network (CNN). GCN realizes definition of convolution on irregular network data structure by defining graph convolution through graph theory or local space, thereby making better use of relational information for prediction. Due to a large scale of weight matrixes of the GCN, a large amount of training data is usually required to complete the learning.

SUMMARY

Embodiments of the present disclosure provide a method and an apparatus for generating a recommendation model, a content recommendation method, and a content recommendation apparatus, an electronic device and a storage medium.

In a first aspect, embodiments of the present disclosure provide a method for generating a recommendation model. The method includes: obtaining a graph training sample set including a first relation matrix for users, a second relation matrix for recommended contents, and a third relation matrix for the users and the recommended contents; inputting the graph training sample set into a machine learning model to train the machine learning model, in which the machine learning model includes at least one low-rank graph convolutional network, the low-rank graph convolutional network includes a complete weight matrix composed of a first low-rank matrix and a second low-rank matrix, and a training objective of the low-rank graph convolutional network includes a first parameter item for the first low-rank matrix, a second parameter item for the second low-rank matrix and a non-convex low-rank item, and the non-convex low-rank item can be decomposed into a combination of the first low-rank matrix and the second low-rank matrix; and in responding to detecting that a training end condition is met, determining the machine learning model trained currently as a recommendation model matching the graph training sample set.

In a second aspect, embodiments of the present disclosure provide a content recommendation method. The method includes: obtaining a first relation matrix for users and a second relation matrix for recommended contents; inputting the first relation matrix and the second relation matrix into the recommendation model pre-trained by the method for generating a recommendation model according to any embodiment of the disclosure, to obtain a third relation matrix for the users and the recommended contents output by the recommendation model; obtaining a recommended content with a highest weight corresponding to a user from the third relation matrix as a target recommended content; and recommending the target recommended content to the user.

In a third aspect, embodiments of the present disclosure provide an apparatus for generating a recommendation model. The apparatus includes: an obtaining module, a recommendation model training module and a recommendation model generating module.

The obtaining module is configured to obtain a graph training sample set including a first relation matrix for users, a second relation matrix for recommended contents, and a third relation matrix for the users and the recommended contents.

The recommendation model training module is configured to input the graph training sample set into a machine learning model to train the machine learning model, in which the machine learning model includes at least one low-rank graph convolutional network, and the low-rank graph convolutional network includes a complete weight matrix composed of a first low-rank matrix and a second low-rank matrix; in which a training objective of the low-rank graph convolutional network includes a first parameter item for the first low-rank matrix, a second parameter item for the second low-rank matrix and a non-convex low-rank item, and the non-convex low-rank item can be decomposed into a combination of the first low-rank matrix and the second low-rank matrix.

The recommendation model generating module is configured to in responding to detecting that a training end condition is met, determine the machine learning model trained currently as a recommendation model matching the graph training sample set.

In a fourth aspect, embodiments of the present disclosure provide a content recommendation apparatus. The apparatus includes: a first obtaining module, a second obtaining module, a third obtaining module and a recommending module.

The first obtaining module is configured to obtain a first relation matrix for users and a second relation matrix for recommended contents.

The second obtaining module is configured to input the first relation matrix and the second relation matrix into the recommendation model pre-trained by the method for generating a recommendation model according to any embodiment of the disclosure, to obtain a third relation matrix for the users and the recommended contents output by the recommendation model.

The third obtaining module is configured to obtain a recommended content with a highest weight corresponding to a user from the third relation matrix as a target recommended content.

The user recommending module is configured to recommend the target recommended content to the user.

In a fifth aspect, embodiments of the present disclosure provide an electronic device. The electronic device includes: at least one processor, and a memory communicatively connected to the at least one processor. The memory stores instructions executable by the at least one processor, and when the instructions are executed by the at least one processor, the at least one processor is caused to implement the method for generating a recommendation model according to any embodiment of the disclosure, or to implement the content recommendation method according to any embodiment of the disclosure.

In a sixth aspect, embodiments of the present disclosure provide a computer-readable storage medium storing computer instructions. When the computer instructions are executed, a computer is caused to implement the method for generating a recommendation model according to any embodiment of the disclosure, or to implement the content recommendation method according to any embodiment of the disclosure.

It should be understood that the content described in this section is not intended to identify the key or important features of the embodiments of the disclosure, nor is it intended to limit the scope of the present disclosure. Additional features of the present disclosure will be easily understood by the following description.

BRIEF DESCRIPTION OF THE DRAWINGS

The drawings are used to better understand the solution and do not constitute a limitation to the present disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Figure 1A:
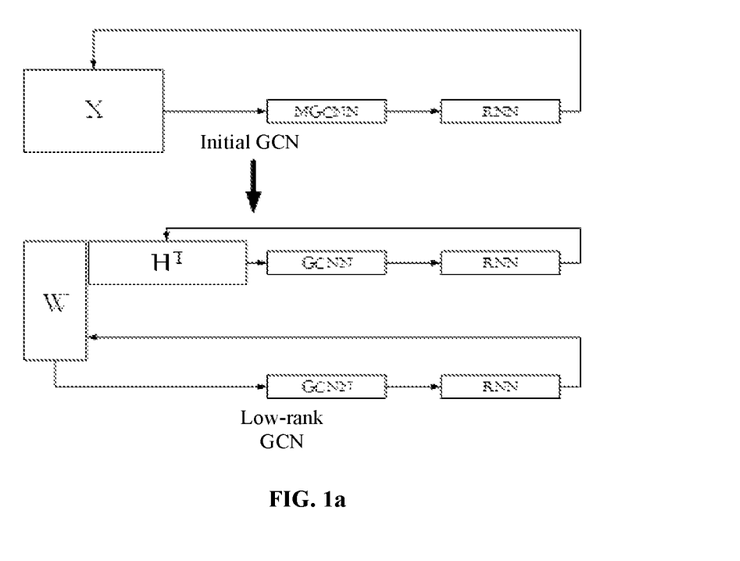
FIG. 1a is a schematic diagram of a structural relation between an initial GCN network and a low-rank GCN network in the related art.

As shown in FIG. 1a, academic community has proposed a low-rank GCN based on Matrix Factorization (MF), which can be obtained by decomposing a weight matrix $X \in \mathcal{R}^{m \times n}$ of an initial GCN into two low-rank matrixes $W \in \mathcal{R}^{m \times k}$ and $H \in \mathcal{R}^{n \times k}$, where $X = WH^T$.

The low-rank GCN is effective due to the fact that a large amount of similar information exists in the data learned by the initial GCN, so the correspondingly learned weight matrix has a low-rank structure. However, from the perspective of low-rank learning, the MF is no longer the best choice. Although the solving speed is faster, the low-rank GCN does not fit the initial GCN well.

Embodiments of the present disclosure provide a method and an apparatus for generating a recommendation model, a content recommendation method, and a content recommendation apparatus, an electronic device and a storage medium, which may reduce data volume required to be learned in a low-rank GCN to the greatest extent while ensuring fitting of the low-rank GCN to an initial GCN, and may improve parameter learning speed of the low-rank GCN.

Embodiment 1

Figure 1B:
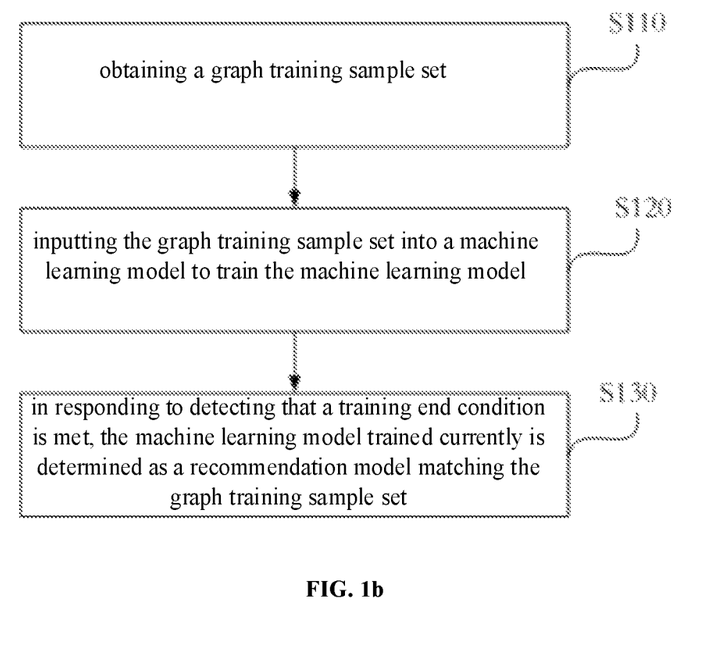
FIG. 1b is a flowchart of a method for generating a recommendation model according to Embodiment 1 of the disclosure.

FIG. 1b is a flowchart of a method for generating a recommendation model according to Embodiment 1 of the disclosure. The technical solution of the embodiment of the disclosure may be applicable to a case of constructing a training objective of a low-rank GCN by using a non-convex low-rank item. This method may be implemented by an apparatus for generating a recommendation model, which can be implemented by software and/or hardware, and is generally integrated in a terminal or a server having data processing functions.

As illustrated in FIG. 1b, the technical solution of the embodiment of the disclosure includes the followings.

At block S110, a graph training sample set including a relation matrix for users, a relation matrix for recommended contents, and a relation matrix for the users and the recommended contents is obtained.

In the embodiment, a recommendation model to be trained is a model based on GCN. Based on the GCN, convolution can be defined in an irregular graph network structure (e.g., user-recommended content network structure), and then different recommended contents can be determined to be provided to different users through the model. The above-mentioned recommended content may include content with crowd properties tendency, such as movies, TV series, news, novels, or music.

Correspondingly, it is required to use a matched graph training sample set to train a preset machine learning model based on the nature of the recommendation model, so as to obtain a required recommendation model.

Figure 1C:
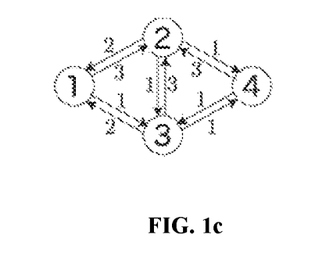
FIG. 1c is a schematic diagram of a user relation applicable to Embodiment 1 of the disclosure.

The relation matrix for users specifically refers to a matrix used to represent an association relation between different users, which may be generated by a user relation graph. FIG. 1c is a user relation graph, in which four figures 1, 2, 3, and 4 in FIG. 1c represent four users, an arrow between each two users represents an association relation between the two users, and a figure on each arrow represents an associated weight. Determination of the arrow direction in the user relation graph and selection of the association weight are preset according to actual conditions, for example, according to the ages, occupations, and hobbies of the users, which is not limited in this embodiment.

In detail, according to the user relation graph shown in FIG. 1c, a relation matrix for users (i.e., an adjacency matrix of the graph) is obtained, which may be as follows:

$$\begin{bmatrix} 0 & 3 & 1 & 0 \\ 2 & 0 & 1 & 1 \\ 2 & 3 & 0 & 1 \\ 0 & 3 & 1 & 0 \end{bmatrix}.$$

The first to fourth rows and the first to fourth columns represent user 1 to user 4. For example, element 0 in the first row and the first column means that the association weight of user 1 with respect to user 1 is 0, and element 3 in the first row and the second column means that the association weight of user 1 with respect to user 2 is 3. After the user relation graph is determined, the relation matrix for users can be also uniquely determined. Generally, a user relation graph composed of M users corresponds to an M*M matrix.

Similarly, the relation matrix for recommended contents specifically refers to a matrix used to represent an association relation between different recommended contents, and the relation matrix for recommended contents is generated by a recommended content relation graph. Generally, the recommended content relation graph composed of N recommended contents corresponds to an N*N matrix.

The relation matrix for the users and the recommended contents specifically refers to a matrix used to represent an association relation between the users and the recommended contents, which is generated based on a relation graph of the users and the recommended contents. Each row in the relation matrix for the users and the recommended content represents a user, and each column represents a recommended content. For example, element A in the first row and first column of the relation matrix for the users and the recommended contents represents an association weight between user 1 and the recommended content 1, and the larger the association weight, the higher the user's satisfaction with the recommended content, or the higher the conformity of the recommended content to the user's actual needs. Generally, a relation graph composed of M users and N recommended contents corresponds to an M*N matrix.

By inputting the above-mentioned graph training sample set into the machine learning model for training, the machine learning model can learn the data of the relation matrix for the users and the recommended contents under joint action of different relation matrixes for users and relation matrixes for recommended contents.

It should be noted that when constructing graph training samples, there is no need to assign a value for each element in the relation matrix for the users and the recommended contents, as long as it is ensured that each user has a corresponding association weight with respect to at least one recommended content, and that for each recommended content, there is at least one user having a corresponding association weight with respect to the recommended content. That is, as long as it is ensured that there is no row or column in which all elements are 0 in the relation matrix for the users and the recommended contents.

At block S120, the graph training sample set is input into a machine learning model to train the machine learning model.

The machine learning model includes at least one low-rank graph convolutional network, and the low-rank graph convolutional network includes a complete weight matrix composed of a first low-rank matrix and a second low-rank matrix. That is, as illustrated in FIG. 1*a*, in each low-rank graph convolutional network, a complete weight matrix X in the initial GCN can be generated based on a first low-rank matrix W and a second low-rank matrix H.

In detail, depending on a specific model form, the low-rank graph convolutional networks may be connected in series or parallel, which is not limited in this embodiment.

As mentioned above, for the initial graph convolutional network in the related art, it is assumed that the rows and columns of the complete weight matrix of the graph convolutional network have a geometric structure, which are stored in an undirected graph Gr (corresponding to the relation matrix for users in the graph training samples) and an undirected graph Gc (corresponding to the relation matrix for recommended contents in the graph training samples). For each graph (taking Gc as an example, a corresponding processing method is adaptable to Gr), a normalized Laplacian matrix $L_c = D_c^{-1/2}(A_c+I)D_c^{-1/2}$ can be extracted, where Ac is an adjacency matrix corresponding to Gc, and $$D_c = \text{diag}\left(\sum_j A_c(i,j)\right)$$

corresponds to a degree matrix.

As illustrated, for Gc in FIG. 1*c*, the corresponding Ac is represented as:

$$\begin{bmatrix} 0 & 3 & 1 & 0 \\ 2 & 0 & 1 & 1 \\ 2 & 3 & 0 & 1 \\ 0 & 3 & 1 & 0 \end{bmatrix}.$$

The corresponding Dc is represented as:

$$\begin{bmatrix} 400 & 0 & & \\ & 0400 & & \\ & & 0060 & \\ 0 & & & 004 \end{bmatrix}.$$

The corresponding Lc is represented as:

$$\begin{bmatrix} 4-3-10 \\ -24-1-1 \\ -2-36-1 \\ 0-3-14 \end{bmatrix}.$$

$X_\Theta$ represents an output result (that is, the complete weight matrix) of the GCN in which the matrix parameter is $\Theta$. Taking one-layer GCN as an example, in a multi-graph GCN, $X_\Theta$ is represented as:

$$X_\Theta = \text{GCN}(X^0;\Theta) = \text{relu}(L_r X^0 L_c \Theta);$$

$X^0$ is a randomly generated weight matrix. relu represents a type of activation function, which represents a "modified linear unit". The relu function sets all negative values in the input matrix to zero, and the rest values remain unchanged. The calculation of the relu function is performed after convolution.

In order to optimize the matrix parameter $\Theta$ of the complete weight matrix, the training objective of GCN is summarized as follows:

$$\min_\Theta \lambda \|\Theta\|_F^2 + f(X_\Theta, Y);$$

Y is known information input from a previous layer of GCN to the current GCN, or information directly input to the machine learning model; $\lambda$ is a hyper-parameter used to coordinate contributions of different items; $\|\cdot\|_F$ represents the F norm. f is a loss function of the machine learning model. The loss function is defined according to different learning problems, which is not limited herein.

As mentioned above, when the complete weight matrix is in the form of M*N, the number of matrix parameters Θ to be learned are M*N, the number of unknown parameters is huge, such that a large number of graph training samples are required.

Correspondingly, after using MF to optimize the initial GCN to a low-rank GCN, the training objective of the low-rank GCN can be summarized as follows:

$$\min_{\Theta_r, \Theta_c} \lambda \|\Theta_r\|_F^2 + \lambda \|\Theta_c\|_F^2 + f(W_{\Theta_r} H_{\Theta_c}^T, Y);$$

$\Theta_r$, $\Theta_c$ are weight parameters corresponding to two low-rank GCNs after the decomposition, respectively, and $W_{\Theta_r}$, $H_{\Theta_c}$ are weight matrixes corresponding to the two low-rank GCNs, respectively. Correspondingly, $W_{\Theta_r}$, $H_{\Theta_c}$ can be represented as:

$$W_{\Theta_r} = GCN(W^0; \Theta_r) = relu(L_r W^0 \Theta_r),$$

$$H_{\Theta_c} = GCN(H^0; \Theta_c) = relu(L_c H^0 \Theta_c),$$

$W^0$, $H^0$ are randomly initialized weight matrixes.

The number of the matrix parameters to be learned included in the training objective can be greatly reduced by decomposing X into two low-rank matrixes, that is, W and H. For example, if $W_{\Theta_r}$ is in a form of M*k, $H_{\Theta_c}$ is in a form of N*k, then a sum of the matrix parameters $\Theta_r$ and $\Theta_c$ to be learned is k(M+N), and k is a parameter that needs to be learned in the low-rank GCN. It can be seen that the number of the matrix parameters to be learned is less than that of the initial GCN.

Based on researches, it is found that if the existing low-rank GCN obtained by the MF cannot perfectly fit the initial GCN, a recommendation accuracy of the recommendation model obtained by the training cannot be guaranteed. Currently, a non-convex regularizer item (also called non-convex low-rank item) may realize a better fitting than the MF. However, through study of the existing non-convex low-rank item, it is found that when using the existing non-convex regular item to learn the low-rank GCN, the solving speed is too slow, and the algorithm needs to be customized, which cannot be effectively applied in a learning process of the low-rank GCN.

Accordingly, a new non-convex low-rank item that can be applied in the low-rank GCN is provided, the new non-convex low-rank item can be decomposed into a combination of a first low-rank matrix and a second low-rank matrix. The above-mentioned non-convex low-rank item can be solved quickly while ensuring the fitting of the low-rank GCN to the initial GCN, and thus the non-convex low-rank item can be effectively applied in the structure of the low-rank GCN.

Correspondingly, in the embodiment, the training objective of the low-rank graph convolutional network includes a first parameter item for the first low-rank matrix, a second parameter item for the second low-rank matrix and a non-convex low-rank item, and the non-convex low-rank item can be decomposed into a combination of the first low-rank matrix and the second low-rank matrix.

In detail, in the process of training the machine learning model, stochastic gradient descent method, gradient descent method, or batch gradient descent method can be adopted to learn the first parameter item and the second parameter item in each low-rank graph convolutional network.

At block S130, in responding to detecting that a training end condition is met, the machine learning model trained currently is determined as a recommendation model matching the graph training sample set.

In detail, the training end condition may be that a loss function meets a preset threshold, or that a current iterative training number has exceeded a preset threshold, which is not limited in the embodiment.

After the training end condition is met, the machine learning model obtained by the current training is used as the recommendation model matching the graph training sample set. Based on the recommendation model, after inputting a new relation matrix for users and a new relation matrix for recommended contents, a corresponding relation matrix for the users and the recommended contents is generated, and then based on the relation matrix for the users and the recommended contents, a content recommendation is performed for users.

In the technical solution of the embodiments of the disclosure, the training objective of the low-rank graph convolutional network is constructed by using the non-convex low-rank item that can be decomposed into a combination of the first low-rank matrix and the second low-rank matrix. Based on the non-convex low-rank item, the accuracy of fitting the two low-rank matrixes obtained by decomposing the low-rank graph convolutional network to the initial weight matrix is ensured, which greatly improving the fitting of the low-rank GCN to the initial GCN, while maintaining characteristics of the low-rank GCN such as a small scale of weights, small data volume, and a fast computing speed.

Embodiment 2

Figure 2:
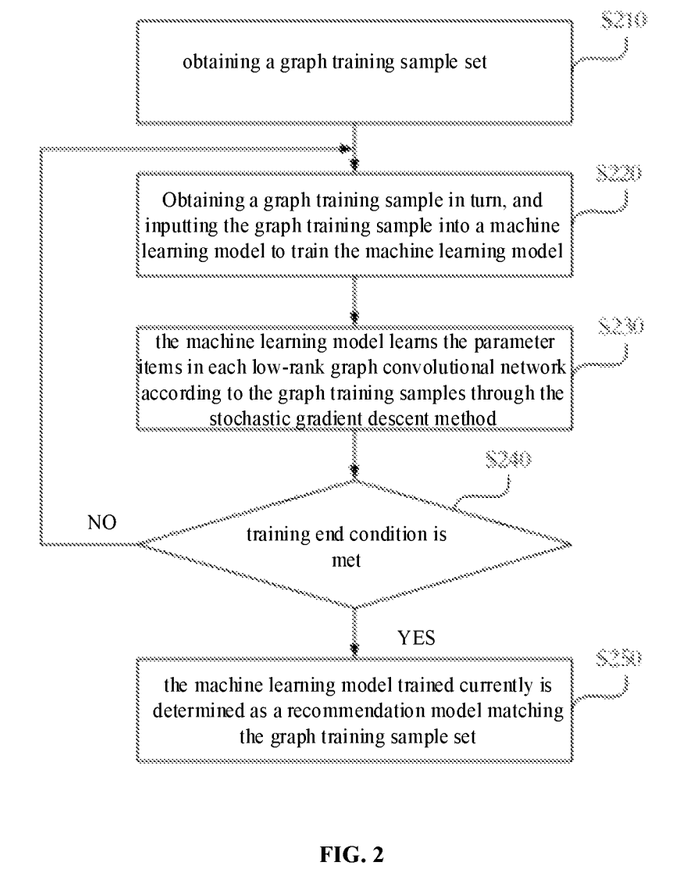
FIG. 2 is a flowchart of a method for generating a recommendation model according to Embodiment 2 of the disclosure.

FIG. 2 is a flowchart of a method for generating a recommendation model according to Embodiment 2 of the disclosure. This embodiment further refines the form of the non-convex low-rank item on the basis of the foregoing embodiment.

Correspondingly, as illustrated in FIG. 2, the technical solution of the embodiment of the disclosure includes the followings.

At block S210, a graph training sample set is obtained.

The graph training sample set includes a relation matrix for users, a relation matrix for recommended contents, and a relation matrix for the users and the recommended contents.

At block S220, a graph training sample is input into a machine learning model in sequence to train the machine learning model.

The machine learning model includes at least one low-rank graph convolutional network, and the low-rank graph convolutional network includes a complete weight matrix composed of a first low-rank matrix and a second low-rank matrix.

A training objective of the low-rank graph convolutional network includes a first parameter item for the first low-rank matrix, a second parameter item for the second low-rank matrix and a non-convex low-rank item, and the non-convex low-rank item can be decomposed into a combination of the first low-rank matrix and the second low-rank matrix.

In the embodiment, the non-convex low-rank item is a difference matrix between a nuclear norm of the complete weight matrix and a Frobenius norm of the complete weight matrix.

Based on researches, it is found that for the non-convex low-rank item (e.g., MCP or capped L1) proposed in the related art, different penalty functions are adopted for singular values of the weight matrix. Therefore, if such non-convex low-rank item is used as the training objective of the low-rank GCN, a large number of decomposition operations on singular values are required, which is costly and has a slow solving speed. Meanwhile, it is difficult to find a common function that penalizes vectors containing all singular values at one time, the non-convex low-rank item cannot be accelerated by MF. Therefore, through theoretical analysis and experimental practice, a new non-convex low-rank item is proposed and represented as the difference matrix between a nuclear norm of the complete weight matrix and a Frobenius norm of the complete weight matrix. This new non-convex low-rank item can achieve the same matrix fitting effect as the non-convex low-rank item in the related art. Meanwhile, both the nuclear norm and the Frobenius norm of the new non-convex low-rank item can be decomposed into the combination of two low-rank matrixes, thereby solving computing problems in the related art and reducing the number of the required samples.

Correspondingly, the new non-convex low-rank item may be represented as:

$$r(X) = \|X\|_* - \|X\|_F$$

$\|X\|_*$ is a nuclear norm of a matrix, which is defined as a sum of the singular values in the matrix, in which $$\|X\|_F = \|W_{\Theta_r} H_{\Theta_c}^T\|_F.$$

Next, based on $$\|X\|_* = \min_{X = WH^T} \frac{1}{2}(\|W\|_F^2 + \|H\|_F^2),$$

r(X) can be written in a form of:

$$r(X) = \frac{1}{2}(\|W_{\Theta_r}\|_F^2 + \|H_{\Theta_c}\|_F^2) - \|W_{\Theta_r} H_{\Theta_c}^T\|_F$$

Furthermore, by applying this new non-convex low-rank item, a good effect of the existing non-convex regular item is obtained, and a fast speed of MF is maintained.

Correspondingly, the training objective of the low-rank graph convolutional network may specifically include:

$$\min_{\Theta_r, \Theta_c} \lambda \|\Theta_r\|_F^2 + \lambda \|\Theta_c\|_F^2 + f(W_{\Theta_r} H_{\Theta_c}^T, Y) + \frac{1}{2}(\|W_{\Theta_r}\|_F^2 + \|H_{\Theta_c}\|_F^2) - \|W_{\Theta_r} H_{\Theta_c}^T\|_F,$$

$\Theta_r$ is the first parameter item, $\Theta_c$ is the second parameter item, $\|\cdot\|_F$ represents a Frobenius norm of a matrix in, $\lambda$ is a hyper-parameter, $f(W_{\Theta_r} H_{\Theta_c}^T, Y)$ is a loss function in the machine learning model; $W_{\Theta_r}$ is the first low-rank matrix under the first parameter item $\Theta_r$, $H_{\Theta_c}$ is the second low-rank matrix under the second parameter item $\Theta_c$; and $W_{\Theta_r} H_{\Theta_c}^T = X_\Theta$, $X_\Theta$ is a weight matrix under all parameter items $\Theta$, and Y is known information input into the low-rank graph convolutional network.

Taking the matrix completion problem as an example, the loss function of the machine learning model $f(W_{\Theta_r} H_{\Theta_c}^T, Y)$ is represented by:

$$f(W_{\Theta_r} H_{\Theta_c}^T, Y) = \|\Omega \odot (W_{\Theta_r} H_{\Theta_c}^T - Y)\|_F^2$$

$\Omega$ is a position of observation data in Y, i.e., the position in Y where the data value is not 0. By using the loss function to solve the matrix completion problem, the degree of fitting of the first low-rank matrix and the second low-rank matrix to the complete weight matrix is further improved, and the prediction accuracy of the resulting recommendation model is further improved.

At block S230, in the process of training the machine learning model, a stochastic gradient descent method is used to learn the first parameter item and the second parameter item in each low-rank graph convolutional network.

In this embodiment, from the perspective of optimizing the model parameters $\Theta_r$ and $\Theta_c$, a stochastic gradient descent algorithm is adopted instead of a (batch) gradient descent algorithm. Convergence speed of the algorithm can be accelerated with the largest probability by randomly selecting a sample to update the model parameters.

At block S240, it is determined whether the training end condition is met, if yes, S250 is executed, otherwise, S220 is executed again.

At block S250, the machine learning model trained currently is determined as the recommendation model matching the graph training sample set.

In the technical solution of the embodiments of the disclosure, a difference between the nuclear norm and the Frobenius norm is used to construct a non-convex low-rank item as the training objective of the low-rank GCN, based on the non-convex low-rank item, the accuracy of fitting the two low-ranks obtained by decomposing the low-rank graph convolutional network to the initial weight matrix is guaranteed, which greatly improving the fitting of the low-rank GCN to the initial GCN, while maintaining the characteristics of the low-rank GCN, such as a small scale of weights, small data volume required, and a fast computing speed.

Embodiment 3

Figure 3:
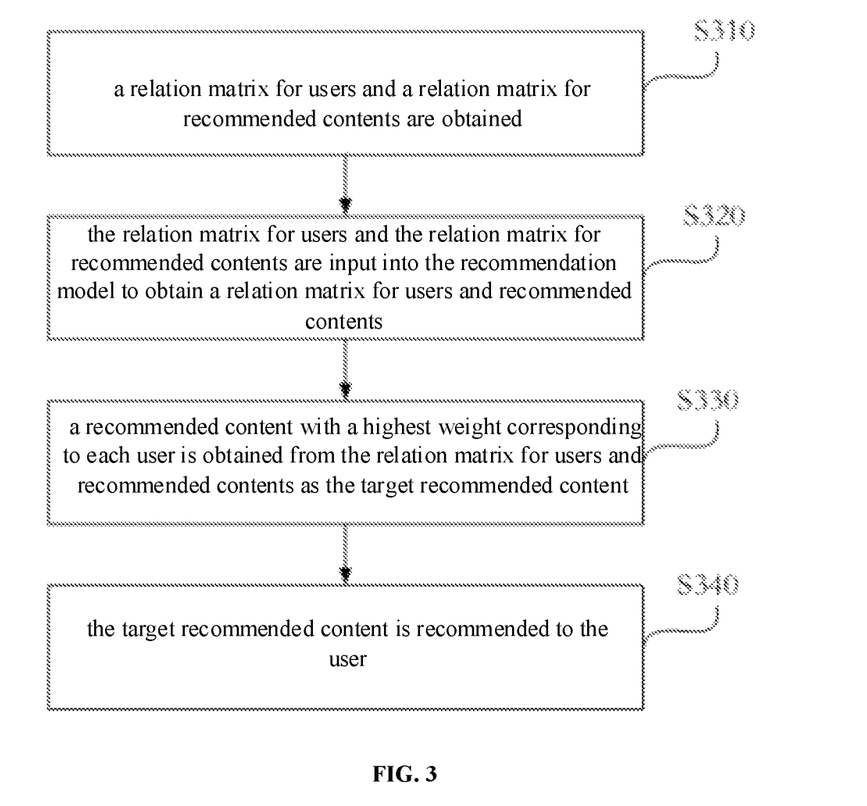
FIG. 3 is a flowchart of a content recommendation method according to Embodiment 3 of the disclosure.

FIG. 3 is a flowchart of a content recommendation method according to Embodiment 3 of the disclosure. The technical solution of the embodiment of the disclosure may be applied to the case of recommending recommended content to users based on a user relation graph and a recommended content relation graph. The method may be implemented by a content recommendation apparatus that may be implemented by software and/or hardware, and generally integrated in a terminal or a server with data processing functions.

As illustrated in FIG. 3, the technical solution of the embodiment of the disclosure further includes the followings.

At block S310, a relation matrix for users and a relation matrix for recommended contents are obtained.

In detail, the relation matrix for users specifically refers to a matrix that is generated according to the user relation graph of a plurality of users and used to represent an association relation among different users. The relation matrix for recommended contents refers to a matrix that is generated based on a content relation graph of a plurality of recommended contents that can be used as recommendation targets, and is used to represent an association relation between different recommended contents.

At block S320, the relation matrix for users and the relation matrix for recommended contents are input into the recommendation model pre-trained by the method for generating a recommendation model of any embodiment of the disclosure, to obtain a relation matrix for the target users and the recommended contents output by the recommendation model.

In this embodiment, the recommendation model is generated by the method for generating a recommendation model according to any embodiment of the disclosure, and the recommendation model includes at least one low-rank GCN, and the training objective of the low-rank GCN includes a non-convex low-rank item that can be decomposed into a combination of the first low-rank matrix and the second low-rank matrix. Therefore, the low-rank GCN can fit the initial GCN well, and then the accuracy of the resulting recommendation model can be guaranteed.

Correspondingly, after the relation matrix for users and the relation matrix for recommended contents are input into the recommendation model, the recommendation model output the relation matrix for the users and the recommended contents correspondingly.

The relation matrix for the users and the recommended contents refers to a matrix of an association relation between the users to be recommended and the recommended contents that can be used as the recommendation targets. Each row in the matrix represents a user to be recommended, and each column represents one recommended content that can be a recommendation object.

At block S330, a recommended content with a highest weight corresponding to a user is obtained from the relation matrix for the users and the recommended contents as a target recommended content.

As mentioned above, in the relation matrix for the users and the recommended contents, each row corresponds to a corresponding relation between a specific user to be recommended and recommended contents. Therefore, a recommended content corresponding to a largest value in a row is obtained from the relation matrix for the users and the recommended contents as the target recommended content for the user corresponding to the row.

At block S340, the target recommended content is recommended to the user.

In the technical solution of the embodiments of the disclosure, the non-convex low-rank item that can be decomposed into the combination of the first low-rank matrix and the second low-rank matrix is used as the training objective of the low-rank GCN to generate a recommendation model, and the recommendation model is used to obtain the recommended content corresponding to a user to be recommended. In this way, the prediction accuracy of the model can be further improved, and the conformity of the recommended content to the actual needs of the user is improved, such that the user experience and satisfaction of the user can be improved.

Embodiment 4

Figure 4:
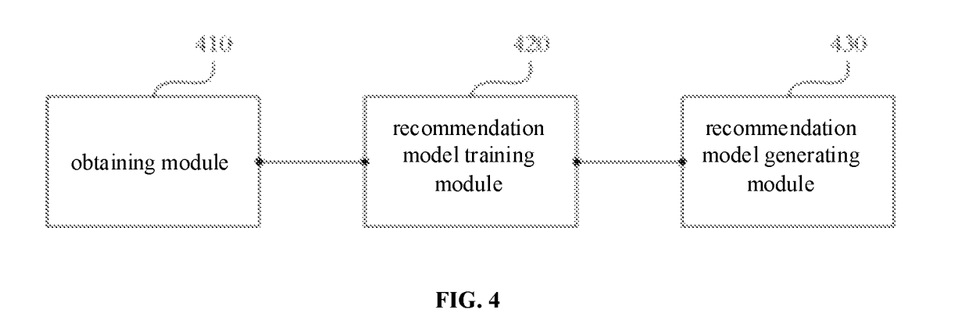
FIG. 4 is a block diagram of an apparatus for generating a recommendation model according to Embodiment 4 of the disclosure.

FIG. 4 is a structural diagram of an apparatus for generating a recommendation model according to Embodiment 4 of the disclosure. As illustrated in FIG. 4, the apparatus includes: an obtaining module 410, a recommendation model training module 420 and a recommendation model generating module 430.

The obtaining module 410 is configured to obtain a graph training sample set including a first relation matrix for users, a second relation matrix for recommended contents, and a third relation matrix for the users and the recommended contents.

The recommendation model training module 420 is configured to input the graph training sample set into a machine learning model to train the machine learning model, in which the machine learning model includes at least one low-rank graph convolutional network, and the low-rank graph convolutional network includes a complete weight matrix composed of a first low-rank matrix and a second low-rank matrix; in which a training objective of the low-rank graph convolutional network includes a first parameter item for the first low-rank matrix, a second parameter item for the second low-rank matrix and a non-convex low-rank item, and the non-convex low-rank item can be decomposed into a combination of the first low-rank matrix and the second low-rank matrix.

The recommendation model generating module 430 is configured to in responding to detecting that a training end condition is met, determine the machine learning model trained currently as a recommendation model matching the graph training sample set.

In the technical solution of the embodiments of the disclosure, the training objective of the low-rank graph convolutional network is constructed by using the non-convex low-rank item that can be decomposed into a combination of the first low-rank matrix and the second low-rank matrix. Based on the non-convex low-rank items, the accuracy of fitting the two low-rank matrixes obtained by decomposing the low-rank graph convolutional network to the initial weight matrix is ensured, which greatly improving the fitting of the low-rank GCN to the initial GCN, while maintaining characteristics of the low-rank GCN such as a small scale of weights, small data volume, and a fast computing speed.

In an embodiment, the non-convex low-rank item is a difference between a nuclear norm of the complete weight matrix and a Frobenius norm of the complete weight matrix.

In an embodiment, the training objective of the low-rank graph convolutional network comprises:

$$\min_{\Theta_r, \Theta_c} \lambda \|\Theta_r\|_F^2 + \lambda \|\Theta_c\|_F^2 + f(W_{\Theta_r} H_{\Theta_c}^T, Y) + \frac{1}{2}(\|W_{\Theta_r}\|_F^2 + \|H_{\Theta_c}\|_F^2) - \|W_{\Theta_r} H_{\Theta_c}^T\|_F,$$

$\Theta_r$ is the first parameter item, $\Theta_c$ is the second parameter item, $\|\cdot\|_F$ represents a Frobenius norm of a matrix in, $\lambda$ is a hyper-parameter, $f(W_{\Theta_r} H_{\Theta_c}^T, Y)$ is a loss function in the machine learning model; $W_{\Theta_r}$ is the first low-rank matrix under the first parameter item $\Theta_r$, $H_{\Theta_c}$ is the second low-rank matrix under the second parameter item $\Theta_c$; and $W_{\Theta_r} H_{\Theta_c}^T = X_\Theta$, $X_\Theta$ is a weight matrix under all parameter items $\Theta$, and Y is known information input into the low-rank graph convolutional network.

In an embodiment, the loss function $f(W_{\Theta_r} H_{\Theta_c}^T, Y)$ is represented by:

$$f(W_{\Theta_r} H_{\Theta_c}^T, Y) = \|\Omega \odot (W_{\Theta_r} H_{\Theta_c}^T - Y)\|_F^2$$

where $\Omega$ is a position of observation data in Y.

In an embodiment, the recommendation model training module is configured to, in the process of training the machine learning model, learn the first parameter item and the second parameter item in each low-rank graph convolutional network based on a stochastic gradient descent method.

The apparatus for generating a recommendation model according to the embodiments of the disclosure can execute the method for generating a recommendation model according to any embodiment of the disclosure, and has the corresponding functional modules and beneficial effects of the execution method.

Embodiment 5

Figure 5:
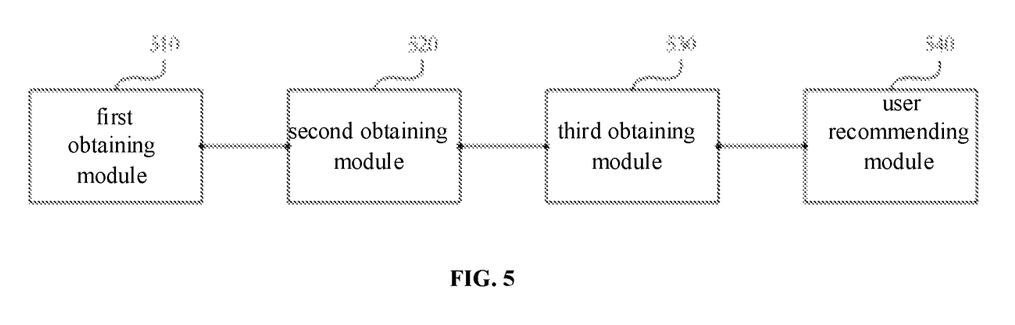
FIG. 5 is a block diagram of a content recommendation apparatus according to Embodiment 5 of the disclosure.

FIG. 5 is a structural diagram of a content recommendation apparatus according to Embodiment 5 of the disclosure. As illustrated in FIG. 5, the apparatus includes: a first obtaining module 510, a second obtaining module 520, a third obtaining module 530 and a user recommending module 540.

The first obtaining module 510 is configured to obtain a first relation matrix for target users and a second relation matrix for target recommended contents.

The second obtaining module 520 is configured to input the first relation matrix and the second relation matrix into the recommendation model pre-trained by the method of any embodiment of the disclosure, to obtain a third relation matrix for the target users and the recommended contents output by the recommendation model.

The third obtaining module 530 is configured to obtain a recommended content with a highest weight corresponding to a user from the third relation matrix as the target recommended content.

The user recommending module 540 is configured to recommend the target recommended content to the user.

In the technical solution of the embodiments of the disclosure, a difference between the nuclear norm and the Frobenius norm is used to construct a non-convex low-rank item as the training objective of the low-rank GCN for generating the recommendation model. The recommended content corresponding to a user to be recommended is obtained by using the recommendation model, such that the prediction accuracy of the model is further improved, and the conformity of the recommended content to the actual needs of the user is improved, thus further improving the user experience and satisfaction of the user.

The content recommendation apparatus according to the embodiments of the disclosure executes the content recommendation method according to any embodiment of the disclosure, and has the corresponding functional modules and beneficial effects for executing the method.

Embodiment 6

According to Embodiment 6 of the disclosure, the disclosure also provides an electronic device and a readable storage medium.

Figure 6:
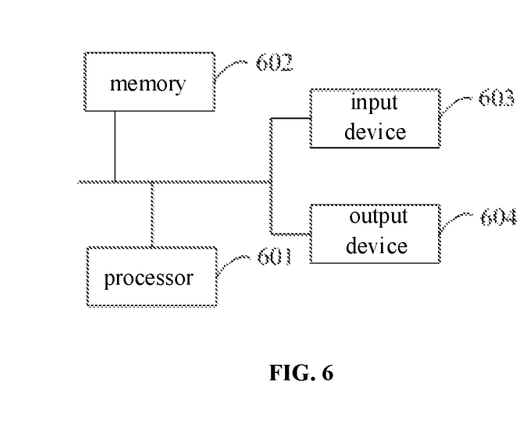
FIG. 6 is a block diagram of an electronic device for implementing a method for generating a recommendation model or a content recommendation method according to Embodiment 6 of the disclosure.

FIG. 6 is a block diagram of an electronic device for implementing a method for generating a recommendation model or a content recommendation method according to any embodiment of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device includes: one or more processors 601, a memory 602, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 601 is taken as an example in FIG. 6.

The memory 602 is a non-transitory computer-readable storage medium according to the disclosure. The memory stores instructions executable by at least one processor, so that the at least one processor executes the method for generating a recommendation model or the content recommendation method according to the disclosure. The non-transitory computer-readable storage medium of the disclosure stores computer instructions, which are used to cause a computer to execute the method for generating a recommendation model or the content recommendation method according to the disclosure.

As a non-transitory computer-readable storage medium, the memory 602 is configured to store non-transitory software programs, non-transitory computer executable programs and modules, such as program instructions/modules (for example, the obtaining module of graph training sample set 410, the recommendation model training module 420 and the recommendation model generating module 430 shown in FIG. 4) corresponding to the method for generating a recommendation model in the embodiment of the present disclosure, or the program instructions/modules corresponding to the content recommendation method according to the embodiments of the disclosure (for example, the input matrix obtaining module 510, the obtaining module of third relation matrix 520, the target recommended content obtaining module 530 and the user recommending module 540 shown in FIG. 5). The processor 601 executes various functional applications and data processing of the server by running non-transitory software programs, instructions, and modules stored in the memory 602, that is, implementing the method for generating the recommendation model or the content recommendation method in the foregoing method embodiments.

The memory 602 may include a storage program area and a storage data area, where the storage program area may store an operating system and application programs required for at least one function. The storage data area may store data created according to the use of the electronic device for implementing the method for generating the recommendation model or the content recommendation method. In addition, the memory 602 may include a high-speed random access memory, and a non-transitory memory, such as at least one magnetic disk storage device, a flash memory device, or other non-transitory solid-state storage device. In some embodiments, the memory 602 may optionally include a memory remotely disposed with respect to the processor 601, and these remote memories may be connected to the electronic device for implementing the method for generating the recommendation model or the content recommendation method according to any embodiment of the disclosure through a network. Examples of the above network include, but are not limited to, the Internet, an intranet, a local area network, a mobile communication network, and combinations thereof.

The electronic device for implementing the method for generating the recommendation model or the content recommendation method may further include: an input device 603 and an output device 604. The processor 601, the memory 602, the input device 603, and the output device 604 may be connected through a bus or in other manners. In FIG. 6, the connection through the bus is taken as an example.

The input device 603 may receive inputted numeric or character information, and generate key signal inputs related to user settings and function control of an electronic device for implementing the method for generating the recommendation model or the content recommendation method, such as a touch screen, a keypad, a mouse, a trackpad, a touchpad, an indication rod, one or more mouse buttons, trackballs, joysticks and other input devices. The output device 604 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server (also known as a cloud computing server or a cloud host), which is a host product in the cloud computing service system to solve management difficulty and slow business expansion of traditional physical host in VPS service.

In the technical solution of the embodiments of the disclosure, the training objective of the low-rank graph convolutional network is constructed by using the non-convex low-rank item that can be decomposed into a combination of the first low-rank matrix and the second low-rank matrix. Based on the non-convex low-rank item, the accuracy of fitting the two low-rank matrixes obtained by decomposing the low-rank graph convolutional network to the initial weight matrix is ensured, which greatly improving the fitting effect of the low-rank GCN to the initial GCN, while maintaining characteristics of the low-rank GCN such as a small scale of weights, small data volume, and s fast computing speed.

In the technical solution of the embodiments of the disclosure, a difference between the nuclear norm and the Frobenius norm is used to construct a non-convex low-rank item as the training objective of the low-rank GCN for generating the recommendation model. The recommended content corresponding to a user to be recommended is obtained by using the recommendation model, such that the prediction accuracy of the model is further improved, and the conformity of the recommended content to the actual needs of the user is improved, thus further improving the user experience and satisfaction of the user.

It should be understood that the various forms of processes shown above can be used to reorder, add or delete steps. For example, the steps described in the disclosure can be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for generating a recommendation model, comprising:
    obtaining a graph training sample set comprising a first relation matrix for users, a second relation matrix for recommended contents, and a third relation matrix for the users and the recommended contents;
    inputting the graph training sample set into a machine learning model to train the machine learning model, wherein the machine learning model comprises at least one low-rank graph convolutional network, and the low-rank graph convolutional network comprises a complete weight matrix composed of a first low-rank matrix and a second low-rank matrix; wherein a training objective of the low-rank graph convolutional network comprises a first parameter item for the first low-rank matrix, a second parameter item for the second low-rank matrix and a non-convex low-rank item, and the non-convex low-rank item can be decomposed into a combination of the first low-rank matrix and the second low-rank matrix; and in responding to detecting that a training end condition is met, determining the machine learning model trained currently as a recommendation model matching the graph training sample set;

wherein the training objective of the low-rank graph convolutional network comprises:

$$\min_{\Theta_r,\Theta_c} \lambda \|\Theta_r\|_F^2 + \lambda \|\Theta_c\|_F^2 + f(W_{\Theta_r} H_{\Theta_c}^T, Y) +$$

$$\frac{1}{2}\left(\|W_{\Theta_r}\|_F^2 + \|H_{\Theta_c}\|_F^2\right) - \|W_{\Theta_r} H_{\Theta_c}^T\|_F,$$

$\Theta_r$ is the first parameter item, $\Theta_c$ is the second parameter item, $\|\cdot\|_F$ represents a Frobenius norm of a matrix in, $\lambda$ is a hyper-parameter, $f(W_{\Theta_r} H_{\Theta_c}^T, Y)$ is a loss function in the machine learning model; $W_{\Theta_r}$ is the first low-rank matrix under the first parameter item $\Theta_r$, $H_{\Theta_c}$ is the second low-rank matrix under the second parameter item $\Theta_c$; and $W_{\Theta_r} H_{\Theta_c}^T = X_\Theta$, $X_\Theta$ is a weight matrix under all parameter items $\Theta$, and Y is known information input into the low-rank graph convolutional network.

2. The method according to claim 1, wherein the non-convex low-rank item is a difference matrix between a nuclear norm of the complete weight matrix and a Frobenius norm of the complete weight matrix.

3. The method according to claim 1, wherein the loss function $f(W_{\Theta_r} H_{\Theta_c}^T, Y)$ is represented by:

$$f(W_{\Theta_r} H_{\Theta_c}^T, Y) = \|\Omega \odot (W_{\Theta_r} H_{\Theta_c}^T - Y)\|_F^2$$

where $\Omega$ is a position of observation data in Y.

4. The method according to claim 1, wherein in the process of training the machine learning model, a stochastic gradient descent method is applicable to learn the first parameter item and the second parameter item in each low-rank graph convolutional network.

5. A content recommendation method, comprising:
obtaining a first relation matrix for users and a second relation matrix for recommended contents;
inputting the first relation matrix and the second relation matrix into the recommendation model pre-trained by the method of claim 1, to obtain a third relation matrix for the users and the recommended contents output by the recommendation model;
obtaining a recommended content with a highest weight corresponding to a user from the third relation matrix as a target recommended content; and
recommending the target recommended content to the user.

6. An electronic device, comprising:
at least one processor; and
a memory connected in communication with the at least one processor; wherein,
the memory stores instructions executable by the at least one processor, when the instructions are executed by the at least one processor, the at least one processor is caused to implement the method for generating a recommendation model or the content recommendation method;

wherein the method for generating a recommendation model comprises: obtaining a graph training sample set comprising a first relation matrix for users, a second relation matrix for recommended contents, and a third relation matrix for the users and the recommended contents; inputting the graph training sample set into a machine learning model to train the machine learning model, wherein the machine learning model comprises at least one low-rank graph convolutional network, and the low-rank graph convolutional network comprises a complete weight matrix composed of a first low-rank matrix and a second low-rank matrix; wherein a training objective of the low-rank graph convolutional network comprises a first parameter item for the first low-rank matrix, a second parameter item for the second low-rank matrix and a non-convex low-rank item, and the non-convex low-rank item can be decomposed into a combination of the first low-rank matrix and the second low-rank matrix; and in responding to detecting that a training end condition is met, determining the machine learning model trained currently as a recommendation model matching the graph training sample set;

wherein the content recommendation method comprises:
obtaining a first relation matrix for users and a second relation matrix for recommended contents; inputting the first relation matrix and the second relation matrix into the recommendation model pre-trained by the method for generating a recommendation model, to obtain a third relation matrix for the users and the recommended contents output by the recommendation model; obtaining a recommended content with a highest weight corresponding to a user from the third relation matrix as a target recommended content; and recommending the target recommended content to the user;

wherein the training objective of the low-rank graph convolutional network comprises:

$$\min_{\Theta_r,\Theta_c} \lambda \|\Theta_r\|_F^2 + \lambda \|\Theta_c\|_F^2 + f(W_{\Theta_r} H_{\Theta_c}^T, Y) +$$

$$\frac{1}{2}\left(\|W_{\Theta_r}\|_F^2 + \|H_{\Theta_c}\|_F^2\right) - \|W_{\Theta_r} H_{\Theta_c}^T\|_F,$$

$\Theta_r$ is the first parameter item, $\Theta_c$ is the second parameter item, $\|\cdot\|$, represents a Frobenius norm of a matrix in, $\lambda$ is a hyper-parameter, $f(W_{\Theta_r} H_{\Theta_c}^T, Y)$ is a loss function in the machine learning model; $W_{\Theta_r}$ is the first low-rank matrix under the first parameter item $\Theta_r$, $H_{\Theta_c}$ is the second low-rank matrix under the second parameter item $\Theta_c$; and $W_{\Theta_r} H_{\Theta_c}^T = X_\Theta$, $X_\Theta$ is a weight matrix under all parameter items $\Theta$, and Y is known information input into the low-rank graph convolutional network.

7. The electronic device according to claim 6, wherein the non-convex low-rank item is a difference matrix between a nuclear norm of the complete weight matrix and a Frobenius norm of the complete weight matrix.

8. The electronic device according to claim 6, wherein the loss function $f(W_{\Theta_r} H_{\Theta_c}^T, Y)$ is represented by:

$$f(W_{\Theta_r} H_{\Theta_c}^T, Y) = \|\Omega \odot (W_{\Theta_r} H_{\Theta_c}^T - Y)\|_F^2$$

where $\Omega$ is a position of observation data in Y.

9. The electronic device according to claim 6, wherein in the process of training the machine learning model, a stochastic gradient descent method is applicable to learn the first parameter item and the second parameter item in each low-rank graph convolutional network.

10. A non-transitory computer-readable storage medium storing computer instructions, wherein when the computer instructions are executed, the computer is caused to implement the method for generating a recommendation model or the content recommendation method;
wherein the method for generating a recommendation model comprises: obtaining a graph training sample set comprising a first relation matrix for users, a second relation matrix for recommended contents, and a third relation matrix for the users and the recommended contents; inputting the graph training sample set into a machine learning model to train the machine learning model, wherein the machine learning model comprises at least one low-rank graph convolutional network, and the low-rank graph convolutional network comprises a complete weight matrix composed of a first low-rank matrix and a second low-rank matrix; wherein a training objective of the low-rank graph convolutional network comprises a first parameter item for the first low-rank matrix, a second parameter item for the second low-rank matrix and a non-convex low-rank item, and the non-convex low-rank item can be decomposed into a combination of the first low-rank matrix and the second low-rank matrix; and in responding to detecting that a training end condition is met, determining the machine learning model trained currently as a recommendation model matching the graph training sample set;
wherein the content recommendation method comprises: obtaining a first relation matrix for users and a second relation matrix for recommended contents; inputting the first relation matrix and the second relation matrix into the recommendation model pre-trained by the method for generating a recommendation model, to obtain a third relation matrix for the users and the recommended contents output by the recommendation model; obtaining a recommended content with a highest weight corresponding to a user from the third relation matrix as a target recommended content; and recommending the target recommended content to the user;
wherein the training objective of the low-rank graph convolutional network comprises:

$$\min_{\Theta_r, \Theta_c} \lambda \|\Theta_r\|_F^2 + \lambda \|\Theta_c\|_F^2 + f(W_{\Theta_r} H_{\Theta_c}^T, Y) +$$

$$\frac{1}{2}(\|W_{\Theta_r}\|_F^2 + \|H_{\Theta_c}\|_F^2) - \|W_{\Theta_r} H_{\Theta_c}^T\|_F,$$

$\Theta_r$ is the first parameter item, $\Theta_c$ is the second parameter item, $\|\cdot\|_F$ represents a Frobenius norm of a matrix in, $\lambda$ is a hyper-parameter, $f(W_{\Theta_r} H_{\Theta_c}^T, Y)$ is a loss function in the machine learning model; $W_{\Theta_r}$ is the first low-rank matrix under the first parameter item $\Theta_r$, $H_{\Theta_c}$ is the second low-rank matrix under the second parameter item $\Theta_c$; and $W_{\Theta_r} H_{\Theta_c}^T = X_\Theta$, $X_\Theta$ is a weight matrix under all parameter items $\Theta$, and Y is known information input into the low-rank graph convolutional network.

11. The storage medium according to claim 10, wherein the non-convex low-rank item is a difference matrix between a nuclear norm of the complete weight matrix and a Frobenius norm of the complete weight matrix.

12. The storage medium according to claim 10, the loss function $f(W_{\Theta_r} H_{\Theta_c}^T, Y)$ is represented by:

$$f(W_{\Theta_r} H_{\Theta_c}^T, Y) = \|\Omega \odot (W_{\Theta_r} H_{\Theta_c}^T - Y)\|_F^2$$

where $\Omega$ is a position of observation data in Y.

13. The storage medium according to claim 10, wherein in the process of training the machine learning model, a stochastic gradient descent method is applicable to learn the first parameter item and the second parameter item in each low-rank graph convolutional network.

* * * * *